(12) United States Patent
Liu

(10) Patent No.: US 7,711,375 B2
(45) Date of Patent: May 4, 2010

(54) METHOD AND SYSTEM FOR DETERMINING A LOCATION OF A WIRELESS TRANSMITTING DEVICE AND GUIDING THE SEARCH FOR THE SAME

(76) Inventor: Hang Liu, 508-1129 Meadowlands Drive, Ottawa, Ontario (CA) K2E 6J6

( * ) Notice: Subject to any disclaimer, the term of this patent is extended or adjusted under 35 U.S.C. 154(b) by 2073 days.

(21) Appl. No.: 10/609,364

(22) Filed: Jun. 30, 2003

(65) Prior Publication Data
US 2004/0029558 A1 Feb. 12, 2004

Related U.S. Application Data

(60) Provisional application No. 60/401,240, filed on Aug. 6, 2002.

(51) Int. Cl.
*H04W 24/00* (2009.01)
*H04M 11/04* (2006.01)
*H04B 7/00* (2006.01)

(52) U.S. Cl. ............. 455/456.1; 455/404.2; 455/457; 455/521; 342/457; 342/458; 342/463; 701/207

(58) Field of Classification Search ............. 455/404.1, 455/404.2, 435.1, 456.1, 456.2, 95, 422.1, 455/424–425, 456.3, 456.5, 457, 517, 521–522, 455/456.6; 379/37, 45; 342/457, 458, 463; 701/207
See application file for complete search history.

(56) References Cited

U.S. PATENT DOCUMENTS

| | | | |
|---|---|---|---|
| 6,026,304 A * | 2/2000 | Hilsenrath et al. | 455/456.2 |
| 6,249,252 B1 * | 6/2001 | Dupray | 342/450 |
| 7,274,332 B1 * | 9/2007 | Dupray | 342/450 |
| 2001/0022558 A1 * | 9/2001 | Karr et al. | 342/450 |
| 2003/0146871 A1 * | 8/2003 | Karr et al. | 342/457 |
| 2003/0198386 A1 * | 10/2003 | Luo | 382/199 |
| 2003/0222820 A1 * | 12/2003 | Karr et al. | 342/457 |
| 2004/0087317 A1 * | 5/2004 | Caci | 455/456.1 |
| 2004/0266457 A1 * | 12/2004 | Dupray | 455/456.5 |

* cited by examiner

*Primary Examiner*—Binh K Tieu

(57) ABSTRACT

Method and system of determining a location of a wireless transmitting device, such as a cellular phone, a wireless PDA or a radio tag, and guiding the searching personnel to physically reach the wireless transmitting device are disclosed that employ a "Movable Detection Station" and a "Guiding and Reference Device", and optionally a "searching robot". The movable detection station is carried on board of a moving platform, such as a police car, an ambulance or a fire truck, or carried by searching personnel. The guiding and reference device is a handheld device including a display device that displays position and guiding information to a user, and a reference wireless transmitter that works with a movable detection station. A searching robot is a robot with a reference transmitter installed on it.

45 Claims, 9 Drawing Sheets

METHOD AND SYSTEM FOR DETERMINING A LOCATION OF A WIRELESS TRANSMITTING DEVICE AND GUIDING THE SEARCH FOR THE SAME

CROSS-REFERENCE TO RELATED APPLICATION

This application claims priority from and is related to the following prior application: "Method and System for Determining a Location of a Wireless Transmitting Device and Guiding the Search for the Same", U.S. Provisional Application No. 60/401240, filed Aug. 6, 2002.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING

Not Applicable.

BACKGROUND OF THE INVENTION

1. Field of the Invention

This invention relates generally to wireless systems and, in particular, to determining the location of a wireless transmitting device, and to guiding the search for said wireless transmitting device.

2. Description of the Related Art

Wireless devices include cellular, PCS (Personal Communication Systems), cordless and satellite phones, wireless PDAs (Personal Digital Assistants) and laptop computers, two-way pagers, radio tags, etc. Collectively these are referred to herein as "wireless devices".

The need for locating, tracking and searching for wireless devices is increasing. Applications include:

Emergency Response:

A notable emergency response service is the enhanced 911 (E911) service mandated by the FCC (Federal Communications Commission) for all cellular licensees, broadband Personal Communications Service (PCS) licensees, and certain Specialized Mobile Radio (SMR) licensees in the United States. E911 service is to provide the operators at the PSAP (Public Safety Answering Point) with information such as calling number, location of serving base station, and caller's Automatic Location Identification (ALI) in longitude and latitude. This automatic information enables the PSAP operators to dispatch emergency response teams for wireless 911 callers in the similar fashion as for the wire line 911 callers. The location accuracy and reliability required by FCC have been revised several times since their first release, compromising what is needed and what is possible. At the time of this invention, the requirements are For handset-based solutions: 50 meters for 67 percent of calls, 150 meters for 95 percent of calls;

For network-based solutions: 100 meters for 67 percent of calls, 300 meters for 95 percent of calls.

Pursuit of Criminals:

To allow law enforcement agencies to track and locate wanted criminals who use wireless devices; to allow the public to report information about offensive callers' identification and location.

Tracking of Fraudulent Calls:

Cellular telephone fraud causes huge revenue losses to the service providers. Real-time location of fraudulent calls will help stop the spread use of "cloned" phones.

Recovery of Stolen Vehicles and Valuable Goods:

Wireless devices attached to the protected objects will enable the tracking and recovery thereof.

Target Monitoring and Searching:

Wireless devices attached to the targets can enable the monitoring and searching of such targets, as children, patients, herds, parolees and probationers, controlled materials and equipment, or toxic waste containers.

Depending on the application, wireless location systems face various technological challenges. Achieving high location accuracy anywhere, anytime, under diversified terrain conditions, and at a low cost is a challenge common to many location applications. Particularly for conventional E911 technologies, the prior art solutions are divided into two major categories: network based and handset based. In network based prior art solutions, location accuracy is sensitive to multipath propagation, number of available detection stations, and geographical geometry of the target in relation to the available detection stations. In handset based prior art solutions using GPS, location accuracy is susceptible to blockage in dense urban areas and inside buildings. The handset based prior art solutions also have problems to provide E911 service to legacy devices already in use. To achieve a required accuracy throughout coverage areas and terrains, the cost is often found far beyond the acceptable limit for operators and many end users. In addition, the prior art E911 solutions do not address the need to guide the search for the target on site.

BRIEF SUMMARY OF THE INVENTION

A method and a system to locate wireless devices that are transmitting wireless signals (referred to herein as "Target Wireless Transmitting Devices", or "Wireless Transmitting Devices", or "Target Devices", or TD for short), and to guide the search personnel(s) or searching robot(s) to physically reach the wireless transmitting devices are described through preferred embodiments.

In one aspect of this invention, the method utilizes a system that is composed of one or a plurality of detection stations (DS), at least one of the DSs is carried on board of a moving platform (herein referred to as a Movable Detection Station, or MDS, for short), for examples, on board of a police car, an ambulance, a fire truck, a helicopter, a balloon, an airship, a boat, or the like, or carried in hand or on shoulder by the operator of the MDS. Either operating alone or operating in conjunction with other DS and MDS, a MDS measures the location of the TD while moving en route to or around the TD. The method thereby involves making use of the advantages that are made available by the mobility of the MDS, by the movement of the MDS, and by the close distances of the MDS with respect to the TD.

In another aspect of this invention, the method utilizes a system that is composed of also one or a plurality of handheld devices, referred to as guiding devices. The guiding devices are used to guide their users to reach the exact position of TD on site.

In yet another aspect of this invention, the method utilizes a system that is composed of also one or a plurality of wireless transmitters that have similar radio properties as the TD, and are referred to as Reference Wireless Transmitting Devices or Reference Transmitter, or RT for short, also carried by the searching personnel(s). The MDS (and DS) measures not only the location of the TD, but also the location of the RT, and provides information about the relative location of the RT with respect to the TD. The method thereby involves making use of the advantages that are made available by the likeness of the radio properties of the TD and RT, by the measurement of the relative (and asymptotically identical) locations of the TD and RT, and by the real time feedback to the search movements. The method also enables a searching robot that is equipped with a RT to work with a MDS accomplishing the searching job.

In still yet another aspect of the invention, the RT and the guiding device are physically combined, and herein referred to as a Guiding and Reference Device, or GRD for short.

Other aspects of the invention will become clear thereafter in the detailed description of the preferred embodiments and the claims.

BRIEF DESCRIPTION OF THE DRAWINGS

The same reference numerals are used in different FIGS. to denote similar elements.

DETAILED DESCRIPTION OF THE INVENTION

In the description hereafter, a cellular phone is used as an example of the Target Device (TD) for convenience of description. It is understood that the method and system described herein do not limit its TD to a cellular phone. Depending on the functionality provided by the TD, the TD may be a cellular phone, a PCS (Personal Communication Systems) phone, a satellite phone, a cordless phone, a two-way pager, a wireless PDA (Personal Digital Assistant), a wireless laptop computer, a data messaging device, a cellular telephone with data messaging capabilities, a wireless Internet appliance, a data communication device (with or without telephony capabilities), or a radio tag, and so on.

Also in the description hereafter, E911 service is used as an example application for convenience of description. It is understood that the method and system described herein do not limit its application to E911 service.

Figure 1:
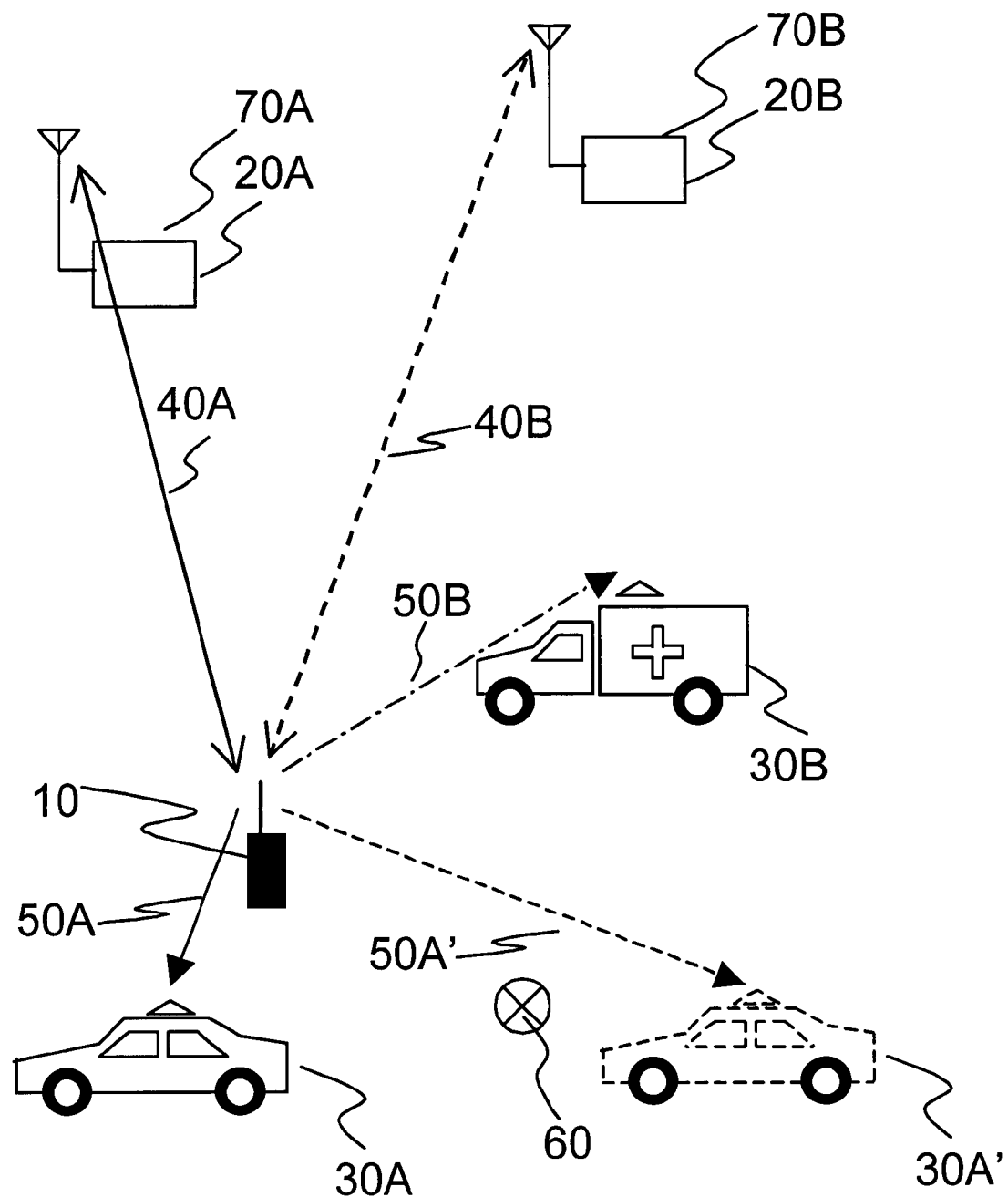
FIG. 1 illustrates the location determination system and the method associated with thereof, in the on-vehicle operation mode, using a cellular phone as an example of target device.

FIG. 1 illustrates the location determination system and the method associated with thereof, in the on-vehicle operation mode, using a cellular phone as an example of TD. Referring to FIG. 1, the TD 10 is a wireless transmitting device whose location is to be determined and searched. The particular TD shown in the figure is a cellular phone that is communicating with a Base Station (BS) 20A through radio link 40A, and in some circumstances (e.g., for a CDMA TD in a soft handoff) also communicating with additional BSs simultaneously, such as with BS 20B via radio link 40B shown also in the figure. The TD 10 is transmitting wireless signals, for example, in verbal communication with an operator at a Public Safety Answering Point (PSAP, not shown in the figure) after dialing the emergency number "911" adopted in the North America, or staying on the line quietly after dialing "911", or being called back by an emergency response officer after hanging up his/her "911" call, or being initiated a wireless transmitting session in a Service Option that is specifically designed for location service, e.g., transmitting a pilot signal. Upon receipt of the "911" call, the PSAP operator would obtain the caller's rough location by means of verbal conversation, and/or by prior art "Phase I" E911 information that is automatically reported to PSAP by the wireless network in terms of serving BS 20A location, and the round trip delay that may also be available, and/or by prior art "Phase II" E911 information that is reported to PSAP in terms of longitude and latitude of TD 10, whose corresponding location is denoted in the figure as 60, that is subject to errors statistically. Emergency response vehicles equipped with Movable Detection Station (MDS) 30A, 30B such as police cars, ambulances, and/or fire trucks are dispatched by PSAP to said rough location. Those skilled in the art understand that the parameters or properties of the transmitted signal by the TD 10, such as the transmitting frequency of the TD, the transmitting slot position of the TD when the TD is operating in TDMA (Time Division Multiple Access) mode, the spreading code information of the TD when the TD is operating in CDMA (Code Division Multiple Access) mode or DSSS (Direct Sequence Spread Spectrum) mode, the frequency hoping information when the TD is operating in frequency hopping mode, phone number, and/or electrical serial number (ESN), can be made available to the MDS 30A, 30B from a database installed within or connected to the PSAP, from the wireless network which is connected to the PSAP, and/or from the air interface of the wireless communication system. Using said parameters or properties, the receivers of MDS 30A, 30B would attempt to acquire and receive the transmitted signal 50A, 50B from the TD 10, while driving en route to the target location. As shown in the figure, along the route the MDS 30A would take a plurality of measurements of the incoming signal 50A', 50A while moving from position 30A' to position 30A, and when taking each of the measurements, the position and orientation of MDS 30A can also be determined using such means as GPS receiver installed on MDS 30A. The plurality of measurements on parameters of the incoming signal 50A', 50A that are performed at different time instants and different positions 30A, 30A', etc., along the route, together with the corresponding positions and orientations of MDS 30A that are determined can be transformed into appropriate location estimation methods that are originally proposed for multiple fixed detection stations that take measurements at same time instants. Along the route, the MDS 30A would continuously take new measurements and continuously refine the estimation of the TD 10 location. Those skilled in the art understand that, in the prior art network based solutions the number of available DSs (usually co-located at the BSs) that "hear" the signal from TD 10 are often found too few, especially in suburban and rural areas; the location geometry of available DSs in prior art that "hear" the signal from TD 10 with respect to the location of TD is often found disadvantageous to the accuracy of the location measurement; the blockage to the line of sight (LOS) propagation path and the multipth propagation effects in urban and suburban areas often cause the DSs at the fixed locations in the prior art network based solutions to produce unacceptable location measurement errors. By using MDS the number of measurements that can be obtained along the route of a MDS movement can be hundreds if not thousands; among them, measurements taken at disadvantageous positions can be excluded or weighted low. The disadvantageous measurements include those having low signal to interference ratios or signal to noise ratios, those of which the LOS or earliest arrival paths are weak or lost; those do not exhibit advantageous geometry with tentatively measured TD location. Said exclusion or weighting process is progressive, i.e., a relatively good measurement will be kept while no better ones are available so far, but once sufficient better measurements become available, those previously preserved relatively "good" ones become not-good-enough and are excluded or weighted lower, and such updating process continues. The detection of the signal to interference ratio or signal to noise ratio can be accomplished by a signal to interference ratio estimator or a signal to noise ratio estimator that is familiar to the skilled in the art; the detection of late arrival multipath propagation paths in an individual measurement for purpose of exclusion in the location calculation can be implemented by a channel impulse response estimator that is familiar to the skilled in the art; disadvantageous geometry with tentatively measured TD location can be measured by geometrical dilution of position (GDOP), which is also well known to the skilled in the art and does not need further explanation. A method that determines whether or not an individually detected earliest arrival propagation path is truly LOS or truly earliest arrival propagation path will be further described subsequently with reference to FIG. 3. The mobility of the MDS can actually correct the measured errors that are caused by blockage of LOS and the multipath propagation through its ray tracing process. This is further explained next by referring to FIG. 2.

Figure 2:
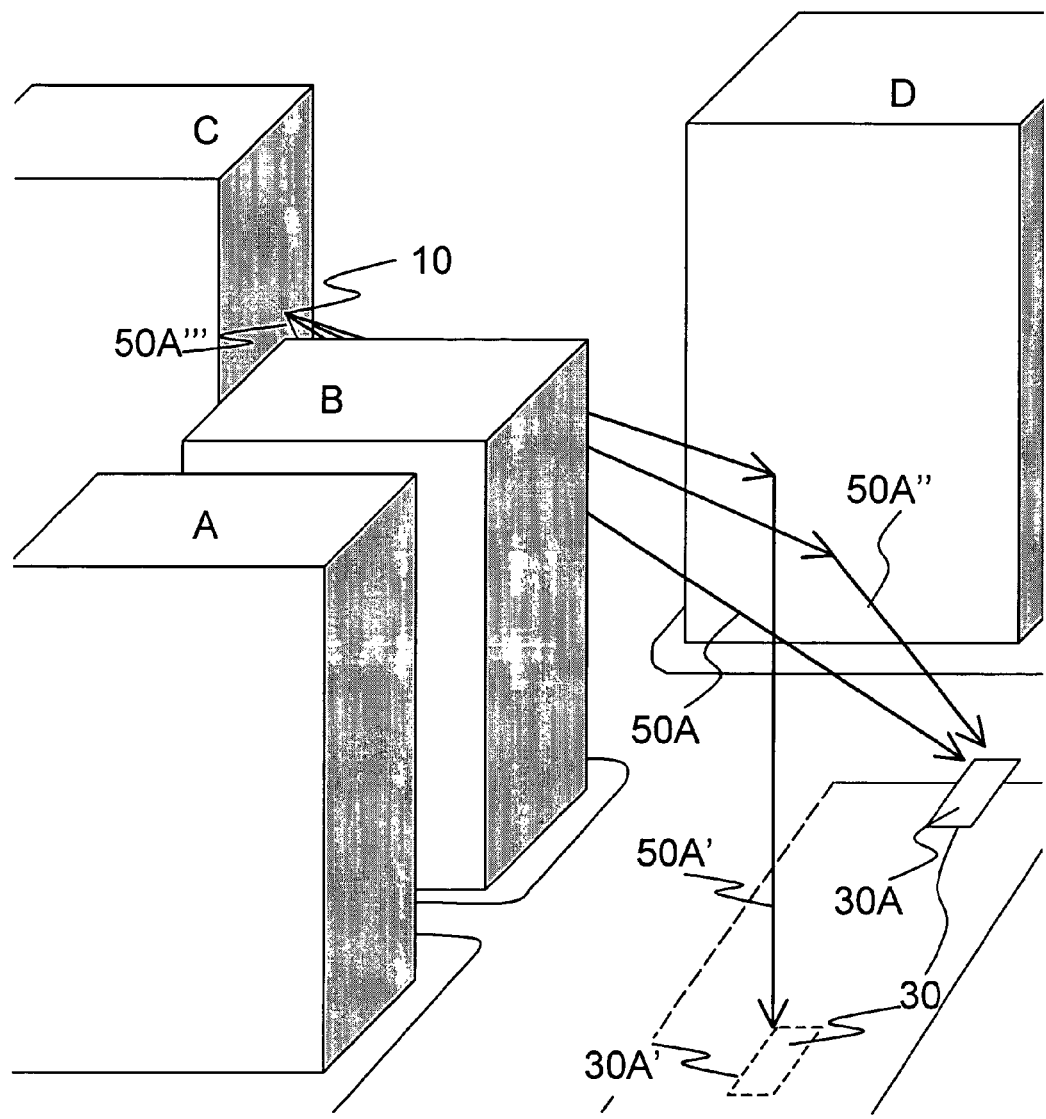
FIG. 2 is an illustration of blockage of line of sight (LOS) and multipath propagation effects in a fictitious urban area that apply to a Movable Detection Station (MDS)

FIG. 2 is an illustration of blockage of line of sight (LOS) and multipath propagation effects in a fictitious urban area that apply to a MDS. Referring now to FIG. 2, the MDS 30 is moving on a street from position 30A' towards 30A. While at position 30A', the LOS 50A''' from TD 10 is blocked by building B, but the MDS 30 receives the signal 50A' from TD 10 that is reflected by building D. The MDS 30 might think the TD is towards the direction of building D and thereby guides the vehicle of MDS 30 driving towards building D. Upon arriving at position 30A in front of building D, the MDS 30 would have obtained similar visibility of building D, and MDS 30 thereby begins to see the LOS ray 50A. Although MDS 30 also sees the reflected path 50A", MDS 30 would "realize" that ray 50A is stronger and arrives earlier, and is a more preferable signal to trace. This guides the MDS 30 driving towards building C where TD 10 is truly located. It can be realized that, without a MDS 30 equipped on board of the emergency response vehicle, a fixed DS co-located at a BS (not shown in the figure) that sees earliest arrival path reflected from building D would have guided the emergency response crew to building D by mistake, and risking the life of the emergency caller.

Figure 3:
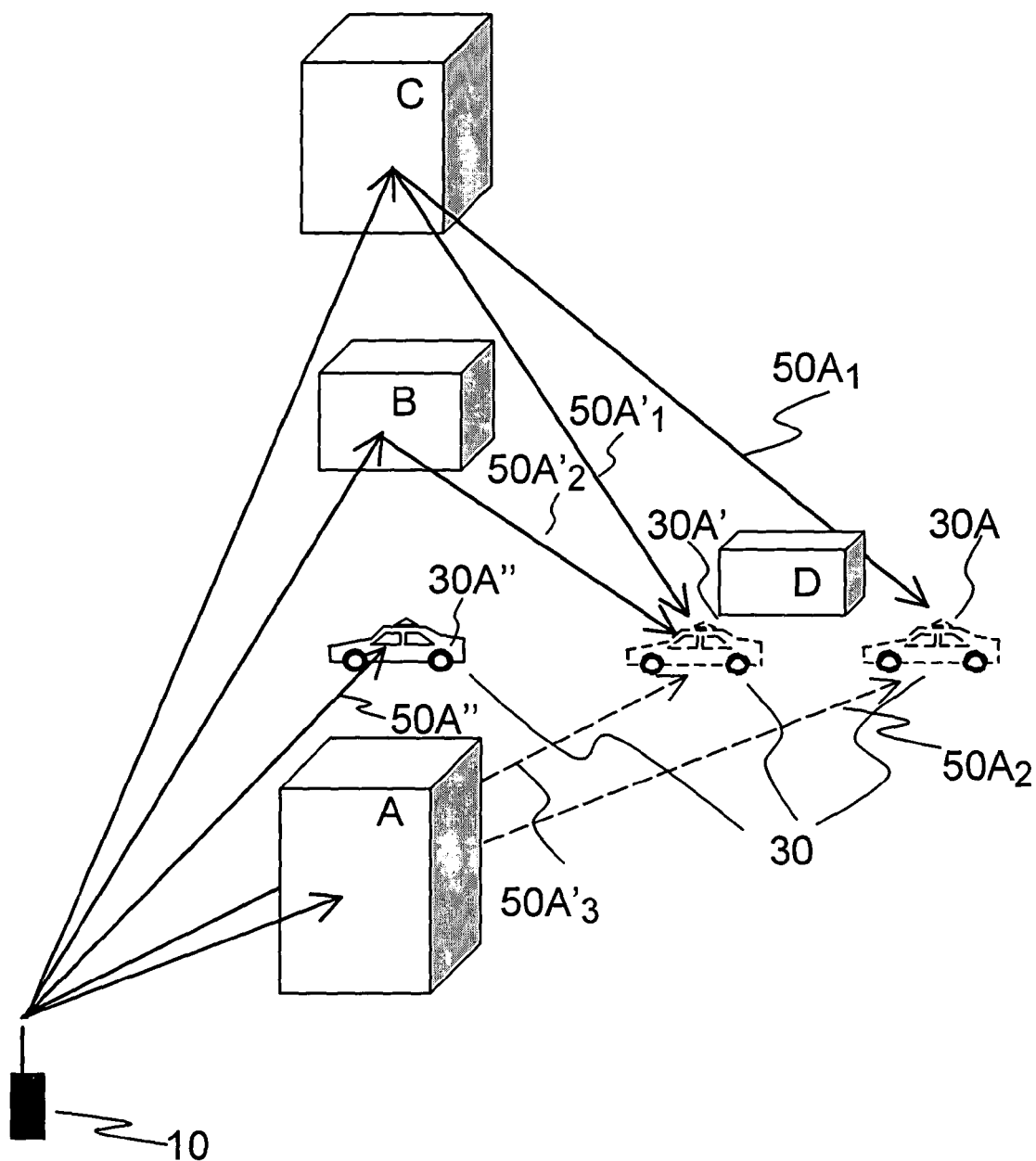
FIG. 3 is an illustration of a method of determining whether or not an individually detected earliest arrival propagation path is truly LOS or truly earliest arrival propagation path, in a fictitious multipath scattering environment that applies to a MDS.

FIG. 3 is an illustration of a method of determining whether or not an individually detected earliest arrival propagation path is truly LOS or truly earliest arrival propagation path, in a fictitious multipath scattering environment that applies to a MDS. Referring now to FIG. 3. A MDS 30 moves along the road and takes measurement on the signals transmitted by TD 10 at positions 30A, 30A' and 30A". Buildings A, B, C, and D in the surrounding area form blockage and/or reflection land structures to the signal propagations from TD 10 to MDS 30. At position 30A, the MDS 30 detects a propagation path $50A_1$ reflected from building C, but the LOS propagation path $50A_2$ is too weak to be detected due to blockage by building A. Therefore, although arriving later than $50A_2$, $50A_1$ is the detected earliest arrival propagation path at position 30A. When the MDS 30 arrives at position 30A', the LOS propagation path $50A'_3$ is still too weak to be detected due to blockage by building A, however MDS 30 can detect propagation path $50A'_1$, and $50A'_2$ reflected from building C and B, respectively. Between $50A'_1$ and $50A'_2$, the MDS 30 can determine that $50A'_2$ arrives earlier than $50A'_1$ through its means to distinguish multipaths. Therefore, $50A'_1$ is determined NOT to be earliest arrival propagation path, while $50A'_2$ is the individually detected earliest arrival propagation path at position 30A'. Whether or not the $50A'_2$ is truly earliest arrival propagation path is still undetermined solely based on measurement taken at position 30A'. Now, based on the measurements taken at two positions, 30A and 30A', we try to determine jointly whether the individually detected earliest arrival propagation paths, $50A'_1$ and $50A'_2$ are truly LOS propagation path or truly earliest arrival path. The method is to measure the difference of the propagation delays of the individually detected earliest arrival propagation paths from TD 10 to MDS 30 at the two positions, 30A and 30A', and also determine the distance between the two positions 30A and 30A'; if the delay difference is larger than the distance divided by the speed of light, then, between the two paths, the longer delay path is determined NOT truly LOS propagation path, or NOT truly earliest arrival propagation path; if the delay difference is not larger than the distance divided by the speed of light, then both paths are still UNCERTAIN whether they are truly LOS propagation paths or truly earliest arrival propagation paths. In this example, if the delay from TD 10 to building C and then to 30A is longer than that from TD 10 to building B and then to 30A' by an amount of distance between 30A and 30A' divided by the speed of light, then the individually detected earliest arrival propagation path $50A'_1$ is NOT truly LOS propagation path or NOT truly earliest arrival propagation path; if the said former delay is shorter than said latter delay by the same said amount, then the individually detected earliest arrival propagation path $50A'_2$ is NOT truly LOS propagation path or NOT truly earliest arrival propagation path; otherwise, both individually detected earliest arrival propagation paths $50A_1$ and $50A'_2$ are still UNCERTAIN whether they are truly LOS propagation path or truly earliest arrival propagation path, solely based on measurements taken at positions 30A and 30A'. When the MDS 30 arrives at position 30A", we see in FIG. 3 that MDS 30 observes the LOS propagation path 50A", however MDS 30 itself does not know about this fact and it still needs to use said individual and said joint method to determine it. In the joint determination method, MDS 30 will measure the delay difference of paths 50A" and $50A'_2$, and determine the distance between 30A" and 30A', use said rules to find out whether any of the paths 50A" and $50A'_2$ can be determined as NOT truly LOS propagation path or NOT truly earliest arrival propagation path. If the paths 50A" and $50A_1$ still remain UNCERTAIN whether they are truly LOS propagation path or truly earliest arrival propagation path, the method can also be further applied to the pair of measurements obtained at positions 30A" and 30A, using the corresponding delay difference and distance between positions 30A" and 30A. While MDS 30 continues to drive further, the method can be further used between any pair of measurements taken along the route where the associated individually detected earliest arrival propagation path remains UNCERTAIN whether it is truly LOS propagation path or truly earliest arrival path.

Now referring back to FIG. 1, in an alternative embodiment, a plurality of MDSs, hereby represented as 30A and 30B, will communicate through direct or indirect radio links (not shown in the figure) with each other, and pass their individually measured parameters regarding signals 50A, 50B from TD 10 to each other 30A,30B. The measured parameters obtained by the plurality of MDSs, 30A,30B are combined in solving the location of TD 10, resulting in higher accuracy and reliability.

Also referring to FIG. 1, in yet another alternative embodiment, one or a plurality of MDSs 30A,30B will further communicate with fixed DS 70A,70B, which may be co-located at BS 20A,20B, through wireless and/or wired communication channels (not shown in the figure), and share their measured parameters regarding signals 40A,40B,50A,50B from TD 10 with one anther 30A,30B,70A,70B. The parameters measured by the MDSs 30A,30B and by the fixed DSs 70A,70B are combined at MDSs 30A,30B and/or at DSs 70A,70B in solving the location of TD 10, resulting in further improved accuracy and reliability.

Figure 4:
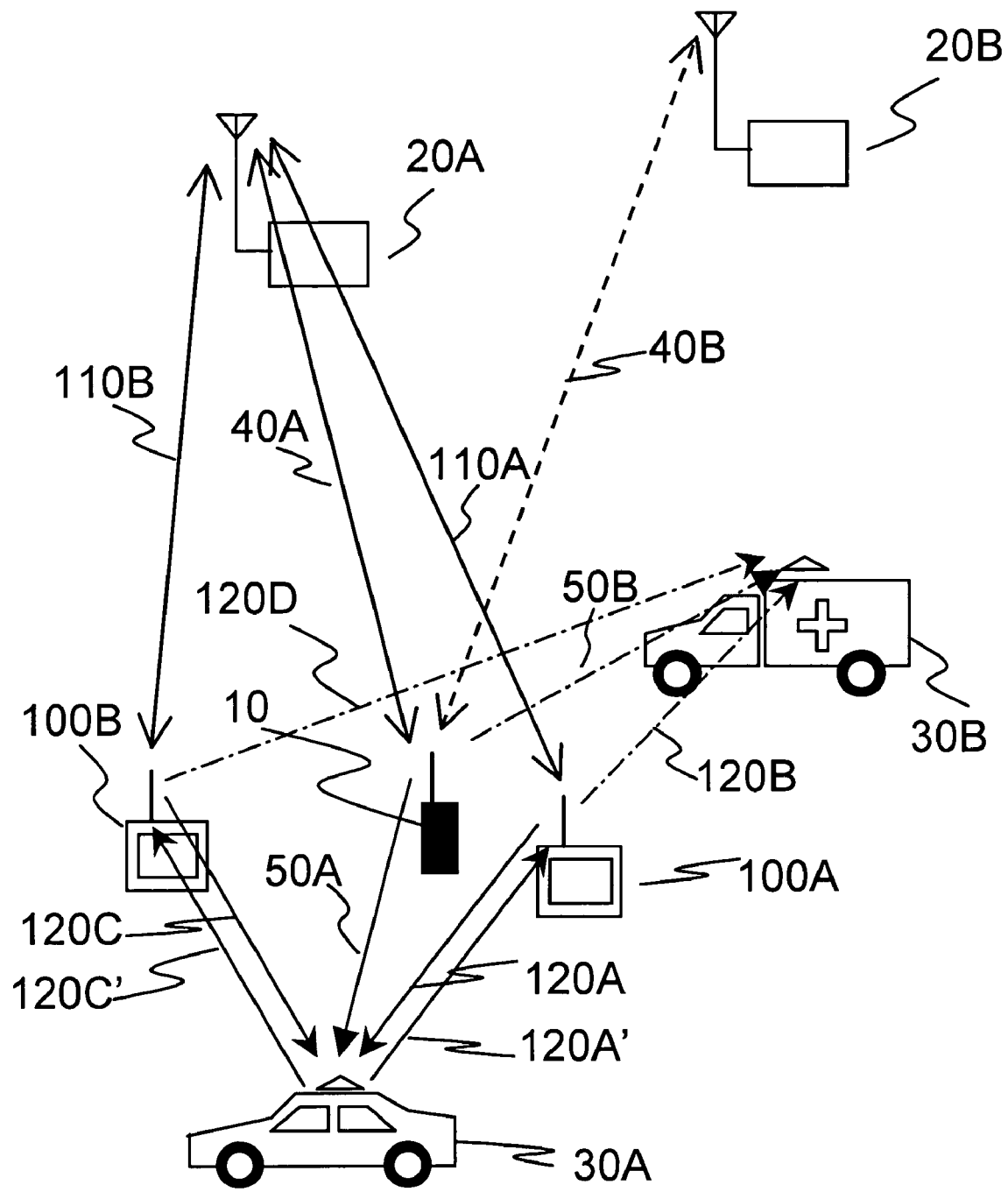
FIG. 4 illustrates the location determination system and the method associated with thereof, in the off-vehicle operation mode, using a cellular phone as an example of target device.

FIG. 4 illustrates the location determination system and the method associated with thereof, in the off-vehicle operation mode, using a cellular phone as an example of TD. Now referring to FIG. 4. After having determined the site (a localized small area or land structure) where TD 10 is located, either using method and system described above, or using alternative methods and systems, or a combination thereof, the MDS equipped vehicle 30A parks at a close location on site. The members of the emergency response team equipped with Guiding and Reference Devices (GRD) 100A,100B walk off the vehicle 30A to approach the exact location of TD 10. A reference transmitter (RT, to be further explained in the description of FIG. 9 subsequently) within the GRD 100A, 100B will set up a call via radio link 110A,110B with the same BS 20A that TD 10 is communicating with. The call on 100A,100B via radio link 100A,110B is in the same operating mode as that of TD 10's call over radio link 40A, e.g., if TD 10 is calling in CDMA mode, then 100A,100B also calls in CDMA mode, if TD 10 is calling in GSM mode, then 100A, 100B also calls in GSM mode, etc. The call of GRD 100A, 100B over the radio link 100A,110B is preferred to be at the same frequency as that of TD 10 over 40A, if possible (e.g., occupying another time slot at the same frequency channel in a TDMA based call, occupying another spreading code at the same frequency channel in a CDMA based call), and when this is impossible (e.g., a call based on FDMA), a channel with as close frequency to the one on radio link 40A as possible is preferred. The same or close frequency, or more generally, the likeness of the radio properties of the associated signals would make the propagation properties for the radio links of TD 10 and GRD 100A,100B similar and asymptotically identical when the GRD 100A,100B approaches the TD 10. The radio signals transmitted from GRD 100A,100B are also being received by the MDS 30A,30B via radio links 120A,120B,120C,120D, and thereby the locations of GRDs 100A,100B are measured by MDS 30A,30B simultaneously while the location of TD 10 is being measured. Although the location measurement accuracy for the TD 10 and that for the GRD 100A,100B each could be individually degraded by blockage of LOS and by multipath propagation, because of the fact that TD 10 and GRD 100A,100B would experience similar and asymptotically identical multipath effects when GRD 100A,100B approaches TD 10, the relative location between TD 10 and GRD 100A,100B measured by the MDS 30A,30B would have been affected very little and thereby is more reliable than the absolute location measurement. In order for the MDS 30A,30B to have similar detectability on signals transmitted by TD 10 and GRD 100A,100B, other signal properties of TD 10 and GRD 100A,100B, such as transmitted power and durations are also preferably made similar to each other. In some occasions, although the emergency response personnel(s) holding the GRD 100A,100B is very close in distance to the TD 10, they might be within difference construction structures such as two different stairs separated by a wall and cannot reach each other. Adding a detection means for the likelihood of such occasions will increase the efficiency of the search. Such detection can be achieved by comparing the likeness of the signal characteristics transmitted by TD 10 and GRD 100A,100B, such as comparing the difference in received signal strengths or reported transmitted power levels of the signals from TD 10 and GRD 100A,100B, and/or comparing the likeness of the multipath propagation profiles thereof. The guiding to the search for TD 10 described herein also applies to a method using a searching robot, wherein a robot replaces the search personnel in function, a RT and a compass sensor installed on the robot replaces the GRD 100A,100B functionality in one part (the functionality of the compass sensor will be described subsequently in reference to FIG. 9), and a display device installed on a robot control station replaces the GRD 100A, 100B functionality in another part. Other aspects remain the same.

Also referring to FIG. 4, the MDS 30A and GRD 100A, 100B also include another set of radio transceivers, preferably Wireless Local Area Network (WLAN) transceivers, to communicate with each other via radio link 120A',120C'. Through radio link 120A',120C', information for display on the screen of GRD 100A,100B is conveyed, to display the TD 10 location relative to those of the GRD 100A,100B, optionally also to those of the MDS 30A,30B, and to guide the users of GRD 100A,100B movement by movement in the search for TD 10. An example of the preferred two dimensional display on screen of GRD 100A,100B and on screen of MDS 30A,30B for absolute and relative locations of the TD 10, GRI) 100A,100B and MDS 30A,30B is shown in FIG. 5.

Figure 5:
FIG. 5 is an exemplary illustration of preferred display on screen for absolute and relative locations of TD, GRD(s) and MDS(s) in two dimensions, overlaid with local area map and remote sensing photo that are pre-stored on system.

Now referring to FIG. 5. FIG. 5 is an exemplary illustration of preferred display on screen for absolute and relative locations of TD, GRD(s) and MDS(s) in two dimensions. Preferably the display is in color (not being able to shown on FIG. 5 due to document format limitation), the symbols that mark the measured locations of TD 10, GRD 100A,100B and MDS 30A,30B are overlaid with local area map, and preferably further overlaid with pre-stored remote sensing photo that shows the land structures.

Figure 6:
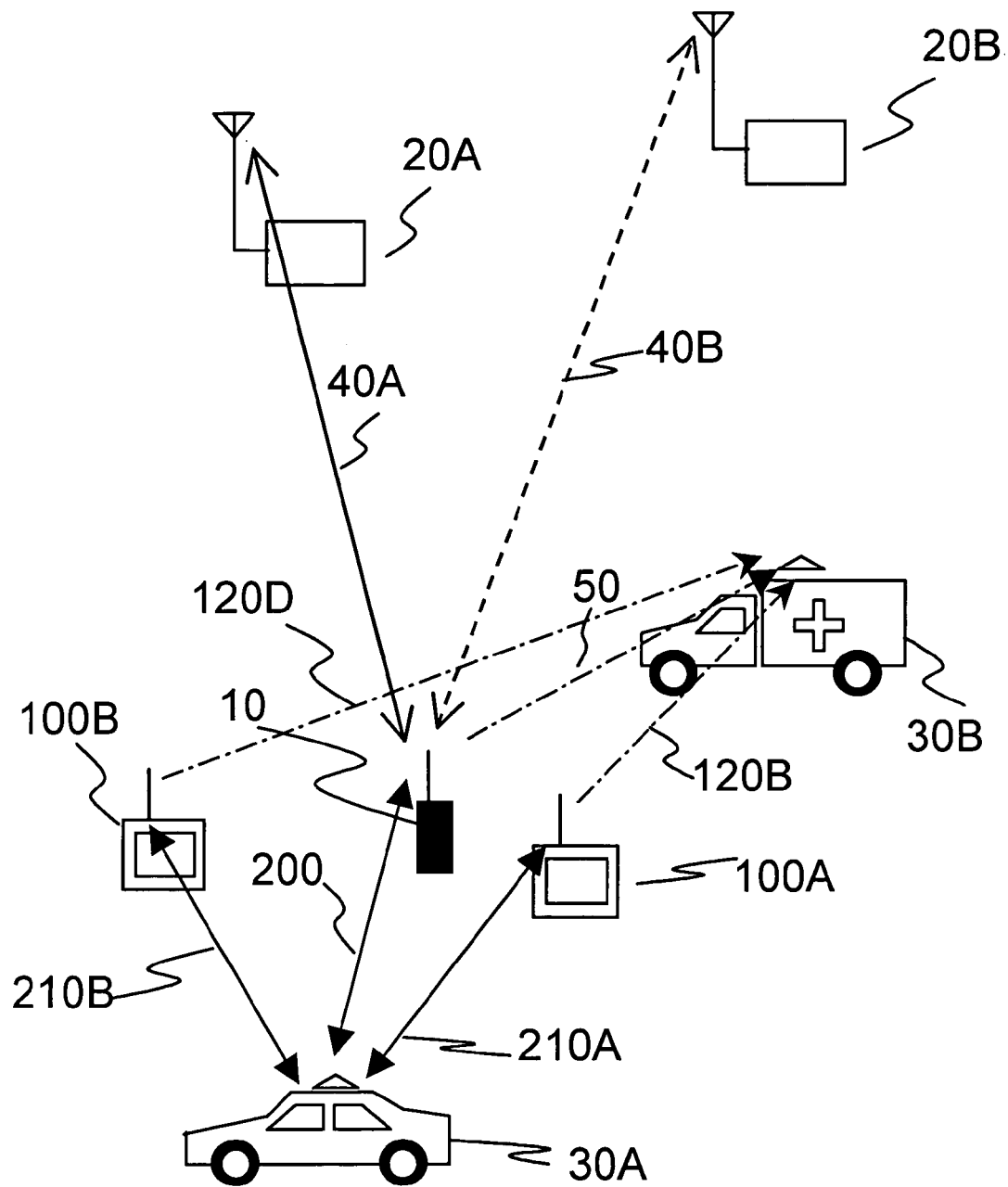
FIG. 6 illustrates an alternative embodiment of the location determination system in which the MDS is equipped with an on-MDS BS transmitter, and the method associated with thereof, in the on-vehicle and off-vehicle operation modes, using a cellular phone as an example of target device.

FIG. 6 illustrates an alternative embodiment of the location determination system in which the MDS 30A,30B are equipped with an on-MDS BS transmitter, and the method associated with thereof, in the on-vehicle and the off-vehicle operation modes, using a cellular phone as an example of target device. Now referring to FIG. 6, in the same way as in the description of FIG. 1, after TD 10 calls 911, the PSAP (not shown in the figure) dispatches the emergency response vehicles that are equipped with MDS 30A,30B to the rough location according to the information obtained by the said PSAP; the TD 10 is transmitting signals to communicate with its serving BS 20A via radio link 40A and in some cases simultaneously with additional BSs, such as BS 20B via the radio link 40B; when the MDS 30A,30B are close enough to the location of TD 10, the MDS 30A,30B can detect the signal being transmitted by TD 10 via radio link 50 and the up link direction of radio link 200 (the direction from TD 10 to MDS 30A) and can start to measure and refine the location of TD 10. At a point when the radio link between TD 10 and one of the dispatched emergency response vehicles, say the link 200 between TD 10 and MDS 30A, becomes of better quality than that of link 40A (and if available, 40B), the corresponding MDS 30A would enable its on-MDS BS transmitter within MDS 30A, and informs the serving BS 20A to send handoff/handover command to TD 10. The said handoff/handover command asks TD 10 to handoff/handover to MDS 30A. Receiving and executing said handoff/handover command, the TD 10 then establishes two-way communication with MDS 30A via radio link 200, and disconnects the radio link(s) 40A (and 40B if available). Because of the close-in distance between TD 10 and MDS 30A and thus the better quality of radio link 200, the communication between the TD 10 and the emergency response team would be more reliable, and in addition, the power control instructions transmitted by the on-MDS BS transmitter within MDS 30A that are available in many wireless standards would result in lower average transmitted power at TD 10 due to the close-in distance to MDS 30A and better quality of radio link 200, and thereby increase the talk time of battery on TD 10 that may be necessary for the continuation of the location detection in progress. Said power control instructions transmitted by the on-MDS BS transmitter within MDS 30A can further take the advantage of being able to coordinate with the MDS 30A measurement activity to further increase the talk time of TD 10, and optimize the signal to interference ratio for better location measurement accuracy. Additional signal properties can also be controlled in coordination with the MDS 30A measurement activities for improved accuracy and battery life. In the same way as in the description of FIG. 4, after having determined the site where TD 10 is located, the MDS equipped vehicle 30A parks at a close location on site; the members of the emergency response team equipped with GRD 100A,100B walk off the vehicle 30A to approach the exact position of TD 10. Unlike in FIG. 4, the reference transmitter (to be further explained in the description of FIG. 9) within the GRD 100A,100B will set up a call via radio link 210A,210B with MDS 30A instead of BS 20A. The call properties on 100A,100B via radio link 210A,210B are otherwise the same as in FIG. 4, e.g., in the same operating mode as that of TD 10's call over radio link 200, preferred to be at the same frequency as that of TD 10 over 200, if possible, and when this is impossible (e.g., a call based on FDMA), a channel with as close frequency to the one on radio link 200 as possible is preferred. The way to utilize GRD 100A,100B to search for the exact position of TD 10 is also the same as in the description of FIG. 4. The down link of 210A,210B (from on-MDS BS transmitter within MDS 30A to the receiver associated with the reference transmitter within GRD 100A,100B) is preferred to perform a new task, to convey the data for display on the screens of GRD 100A,100B, in addition to the possible voice communication between the TD caller and the emergency response officer, eliminating the need for the WLAN transceivers on both MDS 30A,30B and GRD 100A,100B. Further, the power control instructions transmitted by the on-MDS BS transmitter within MDS 30A to the GRD 100A,100B can take the advantage of being able to coordinate with the MDS 30A measurement activity to optimize the signal to interference ratio for better location measurement accuracy of GRD 100A, 100B, and increase the battery life of GRD 100A,100B as well. The frequency and other signal properties of the on-MDS BS transmitter should be chosen appropriately to minimize the impact to the wireless system operation of BS 20A, 20B and their serving users.

Figure 7:
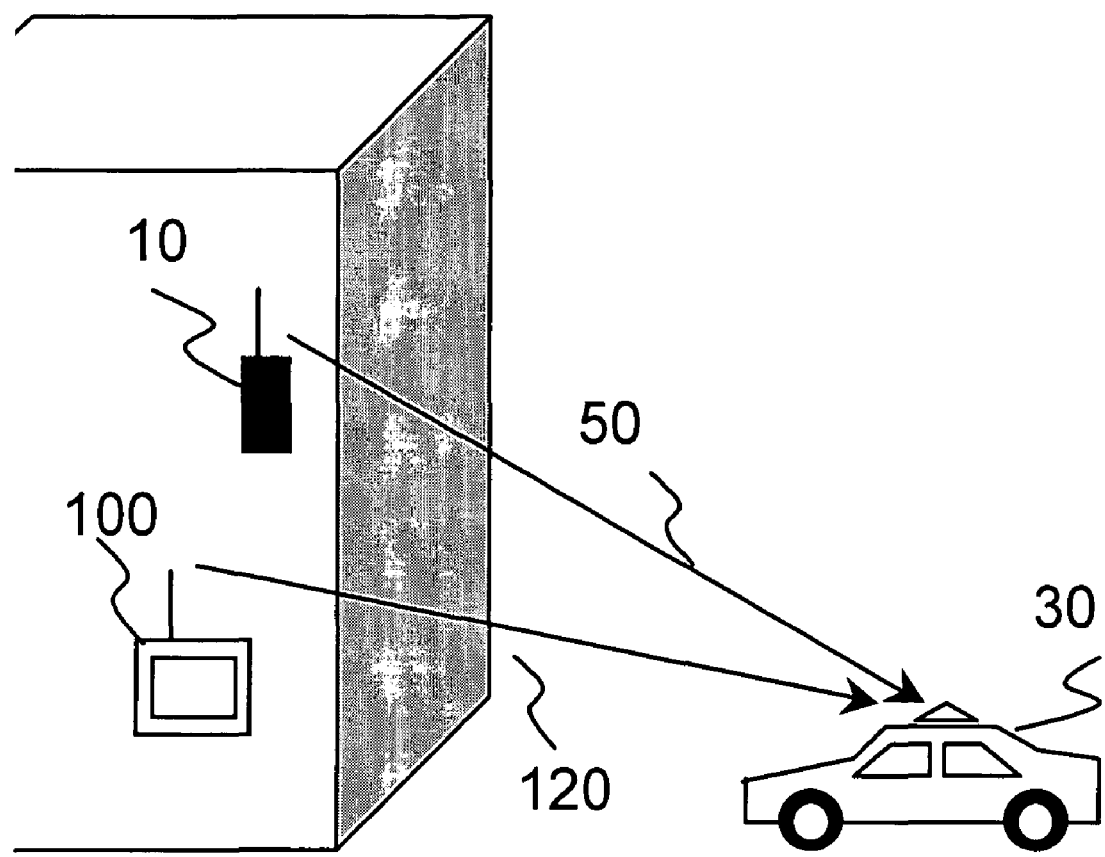
FIG. 7 illustrates the location determination system and the method associated with thereof, in a three-dimensional operation mode, using a cellular phone as an example of target device.

FIG. 7 illustrates the location determination system and the method associated with thereof, in a three-dimensional operation mode, using a cellular phone as an example of TD. Referring to FIG. 7, in a preferred embodiment, when at least one of MDS 30 is sufficiently close to TD 10, or after at least one of the MDS 30 is parked on site, the location measurement is conducted in three dimensions, so that the height of TD 10 and height of GRD 100 would not be a degradation factor in determining location in horizontal plane, and further, said height of TD 10 and height of GRD 100 are also measured and reported on screen of GRD 100 and on screen of MDS 30 to provide additional location information. The format of the display for height is preferably a number marked beside each symbol on a two-dimensional graph, or popped-up beside each symbol upon being commanded by user, the value of the height is preferably being displayed in relative to that of the MDS 30. Alternatively the display for height is in three-dimensional graphical effects.

In the descriptions thereinbefore, the number of the MDS 30 and the number of GRD 100 are exemplary. In the implementation and application of this invention, the number of MDS 30 can be one or plurality, the number of GRD 100 can also be one or plurality. The number of MDS 30 and the number of GRD 100 are not necessarily equal.

Figure 8:
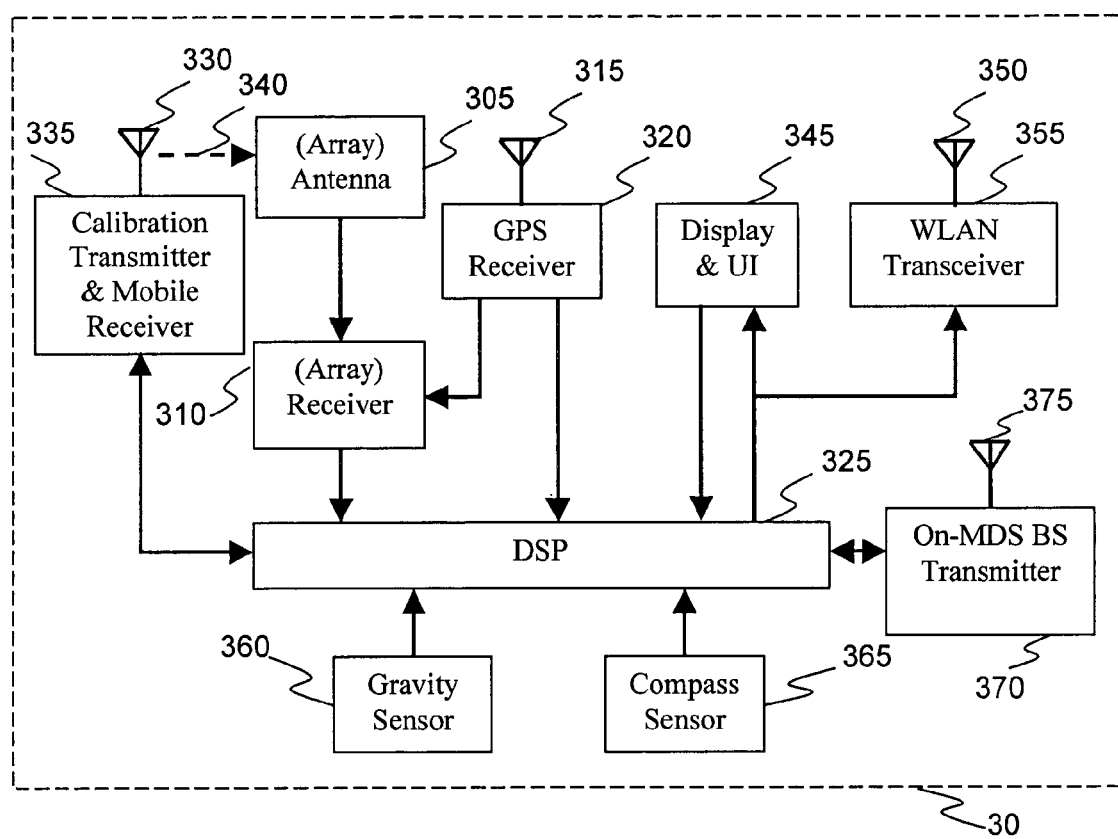
FIG. 8 is a block diagram of the MDS in accordance with the preferred embodiments of the current invention.

FIG. 8 is a block diagram of the MDS in accordance with the preferred embodiments of the current invention. Referring to FIG. 8, the preferred embodiment of MDS 30 is composed of an antenna 305, a receiver 310, a GPS antenna 315, a GPS receiver 320, a digital signal processing (DSP) subsystem 325, a calibration antenna 330, a calibration transmitter and mobile receiver 335, a display and user interface 345, a WLAN antenna 350, a WLAN transceiver 355, a gravity sensor 360 and a compass sensor 365. Optionally, the MDS 30 further includes an on-MDS BS transmitter 370 and a transmitting antenna 375.

The antenna 305 is used to receive the signals from the TD 10, and from GRD 100,100A,100B for measurement of their locations. The antenna 305 is preferred to be an array antenna so as to enable AOA (angle of arrival) measurement of the signals from TD 10 and GRD 100,100A,100B, in addition to such measurements as TOA (time of arrival) and/or TDOA (time difference of arrival) and their variations, as well as other alternative signal parameter measurements. Furthermore, the antenna 305 is preferred to be a three-dimensional array antenna, i.e., the elements of the arrays span in three dimensions, to enable AOA measurement in three dimensions. The antenna 305 is also preferred to be installed on top of the roof of a land vehicle or a water boat, or be installed under lower deck of a helicopter or other types of over-the-air moving platform, to achieve good visibility over a wide range of angles for incoming signals from land structures.

The receiver 310 converts the RF (radio frequency) signals received by antenna 305 to baseband and digitizes the signals. The functionality of the receiver 310 is familiar to those skilled in the art, such as amplifying, down conversion, filtering, automatic gain control, analog to digital conversion, etc., and thereby does not need to elaborate further. For AOA measurement, preferably the receiver 310 is an array receiver that is composed by a plurality of identical channels whose down-conversion stages utilize a common or synchronized frequency source. Preferably said common frequency source is provided by the GPS receiver 320. The digitized baseband output of the receiver 310 is provided to the DSP subsystem 325 for further processing as will be further detailed thereafter.

In an alternative embodiment, the antenna 305 is a narrow beam antenna being installed on a rotating structure with an angle sensor, for measurement of AOA. Said rotating structure is preferably being able to rotate in three dimensions for AOA measurement in three dimensions.

The GPS antenna 315 receives signals from the GPS (Global Positioning System) satellites or from other satellites that perform the similar functionality, such as GLONASS (Global Navigation Satellite System), BEIDOU, or GALILEO in proposal, although still being referred to herein as GPS antenna. The antenna is preferably being installed on top roof of the moving platform to achieve good visibility of the satellites in sky. The signals received are provided to the GPS receiver 320.

The GPS receiver 320 receives signals from GPS satellites provided by the GPS antenna 315, or receive signals from other types of satellites providing the similar functionality such as GLONASS, BEIDOU or GALILEO, although still being referred to herein as GPS receiver. The GPS receiver 320 by receiving and processing the received signals from said satellites produces following output to the rest of the MDS 30: the accurate frequency and time reference source; the location of the MDS 30,30A,30B in terms of longitude, latitude and height as well as the moving direction of the MDS 30,30A,30B, or signals related to thereof.

The antenna 330 is a radio emitting element that is used for calibrating the array antenna 305 and the array receiver 310. The antenna 330 is built with fixed and known propagation delays to each element of the array antenna 305, and preferably is built within the same solid structure of the array antenna 305 to ensure a predetermined delay of the radio link 340 between calibration antenna 330 and each element of the array antenna 305. The calibration signal fed to the calibration antenna is provided by the calibration transmitter 335 to be described next. The antenna 330 also receives signals from the serving basestation(s) 20A,20B of TD 10.

The calibration transmitter part of the calibration transmitter and mobile receiver 335 produces a signal for calibrating the array antenna 305 and the array receiver 310. Preferably it can be programmed to produce the signal with same frequency and the same modulation formats that the TD 10 and the GRD 100,100A,100B would transmit, so that the calibration can be conducted at the exactly same working condition as the MDS 30's location measurement operation would be on. Upon receipt of the TD 10 parameters (e.g., frequency and modulation mode), and before starting the location measurement, the MDS 30 will preferably conduct the calibration. The mobile receiver part of the calibration transmitter and mobile receiver 335 receives signals from serving basestation(s) 20A,20B of TD 10 to obtain signaling messages and network timing.

The display and user interface unit 345 includes a screen to accept data from the DSP subsystems 325 to display the local map with overlaid symbols of TD 10 location, GRD 100, 100A,100B location and the MDS 30,30A,30B location. Preferably the display also shows the stored remote sensing photo of local land structures, being overlaid on the local map. An example has been given in FIG. 5. The unit 345 also accepts user control to the MDS 30.

The WLAN transceiver 355 and the antenna 350 transmits the images or image parameters produced by DSP subsystem 325 to the GRD 100,100A,100B via radio link, for display on screen of GRD 100,100A,100B. Although the unit 355 is referred to herein as a WLAN transceiver and is preferred to utilize a WLAN transceiver, it does not exclude the use of other types of transceivers in implementing the invention.

The gravity sensor 360 reports information about the vehicle tilt to DSP subsystems 325 for use to correct the AOA measurement computation in DSP subsystems 325.

The compass sensor 365 reports the vehicle orientation to DSP subsystems 325 while vehicle is parked, for use to correct the AOA measurement computation in DSP subsystems 325. For the magnetic compass sensors, the sensor is preferably being calibrated by the direction computed by movement based on GPS while moving, to eliminate the magnetic interference of the vehicle structure.

Alternatively, the gravity sensor 360 and compass sensor 365 can be combined into a gyroscope based sensor and/or acceleration sensor.

The DSP subsystem 325 includes signal processing devices such as ASIC (application specific integrated circuits), FPGA (field programmable gate array), DSP processor(s), micro controller(s), and/or general purpose microprocessor(s), memory devices, mass storage devices and peripheral devices. The functionality of DSP subsystem 325 in MDS 30 includes: conducting calibration of the array receiver; computing the AOA, TOA, TDOA and/or other alternative or related parameters of the incoming signals from TD 10 and GRD 100,100A,100B; computing the longitude, latitude and height of the TD 10, GRD 100,100A,100B and MDS 30; while moving, computing the direction of moving of the MDS 30 based on position changes of the MDS 30 reported by the GPS receiver 320; while staying stationary, finding the vehicle orientation based on input from the compass sensor 365; finding the vehicle tilt based on input from the gravity sensor 360; overlaying the positions of MDS 30 (provided by GPS receiver 320 or computed by DSP subsystem 325), the TD 10, and the GRD 100,100A,100B onto a local area map electronically stored in the mass storage device, rotating the overlaid image based on the vehicle moving direction or parking orientation, responding the user's command from user interface 345 to zoom, move, or attribute change to the image, and producing the final image for display; outputting said image to the display and user interface unit 345; outputting the image or image parameters to the WLAN transceiver 355 to transmit to the GRD 100,100A, 100B for display on the GRD screen(s); controlling and configuring all functional parts within MDS 30. When the on-MDS BS transmitter 370 and its associated antenna 375 (to be described in the next paragraph) is equipped within MDS 30, the DSP subsystem 325 (together with receiver 310) further performs all additional functionalities that a BS receiver will perform, e.g., decoding of the in coming signals from TD 10 that are passed to DSP subsystem 325 by receiver 310.

In an alternative embodiment, the MDS 30 further includes an on-MDS BS transmitter 370, and its associated antenna 375. The on-MDS BS transmitter 370 would perform the functionalities of a regular base station transmitter which include performing the communication protocols, converting digital signals to analog, modulating, performing power control for the serving terminals TD 10 and GRD 100,100A, 100B, up-converting to radio frequency, amplifying the power, and radiating the signal through the antenna 375 to the air. In addition, as has been stated in the description of FIG. 6, the on-MDS BS transmitter 370 and antenna 375, when in use, can perform the functionalities of the WLAN transceiver 355 and antenna 350 to convey the data for display on screen of the GRD 100,100A,100B.

Figure 9:
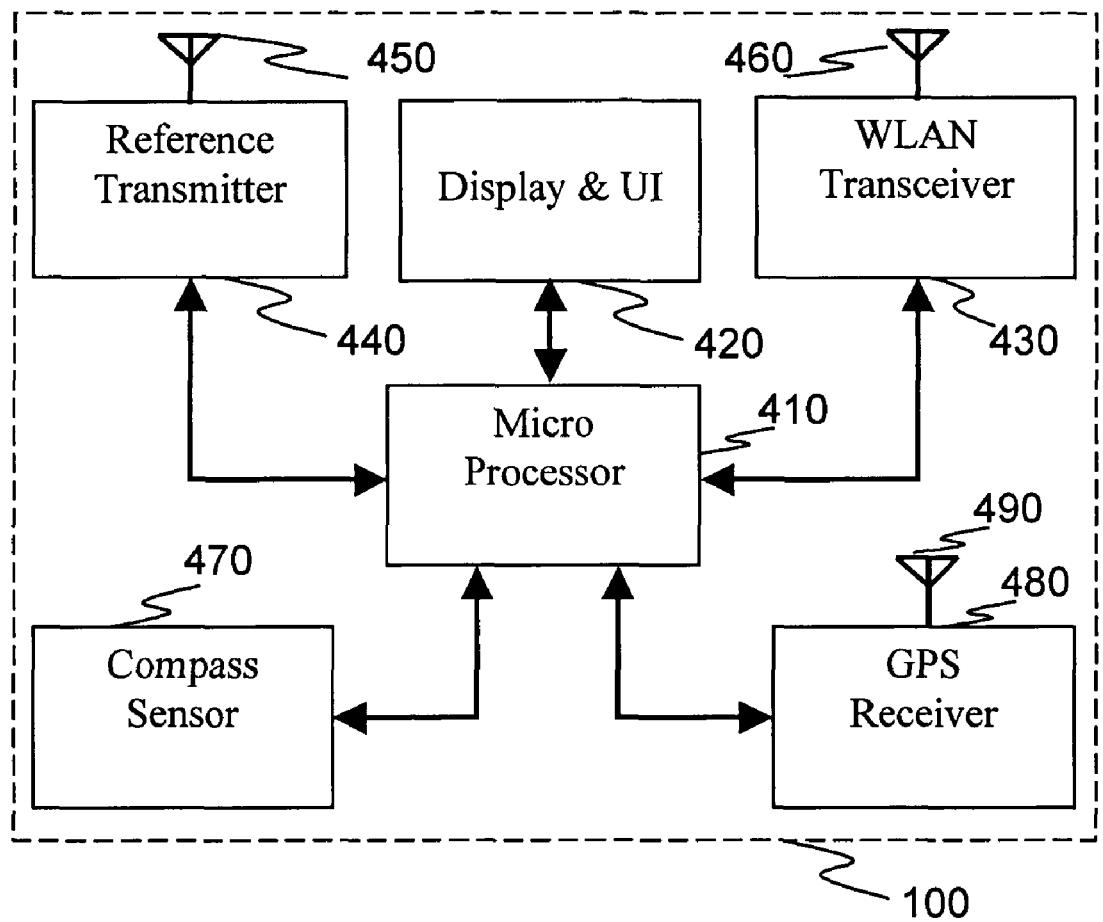
FIG. 9 is a block diagram of the GRD in accordance with the preferred embodiments of the current invention.

FIG. 9 is a block diagram of the GRD in accordance with the preferred embodiments of the current invention. Now referring to FIG. 9, the preferred embodiment of GRD 100 is composed of a reference transmitter 440, an antenna 450 for the reference transmitter, a WLAN transceiver 430, an antenna 460 for the WLAN transceiver, a microprocessor 410, and a display and user interface unit 420. In alternative embodiments as will be further detailed later, the GRD 100 further includes a GPS receiver 480 and an antenna 490 for the GPS receiver, and a compass sensor 470.

The reference transmitter 440 is a device that can transmit the signal at the same or a close frequency and in the same mode of modulation as the TD 10 according to the air interface standard. Depending on the standard in use, usually the transmitter is also required to work with a receiver for such functions as power control, and processing according to protocols defined in the standard. Thereby, in such circumstances the reference transmitter 440 in essence is a mobile station, which includes an associated receiver although not explicitly marked in the figure, and said transmitter (and associated receiver) 440 preferably supports multiple bands and multiple standards. For example, it can also support regular voice communication with any telephone, including calling the TD 10. As has been described earlier, the main functionality of the reference transmitter is to transmit the signal that is measured by MDS 30,30A,30B for determining its location relative to that of the TD 10.

The WLAN transceiver 430 communicates with its counterpart WLAN transceiver 355 in MDS 30 (FIG. 8), to receive the data for display on the display and user interface unit 420 of the GRD 100. Although the unit 430 is referred to herein as a WLAN transceiver and is preferred to utilize a WLAN transceiver, it does not exclude the use of other types of transceivers in implementing the invention.

The microprocessor 410 controls and configures all the functional units in the GRD 100. It also accepts user commands from display and user interface unit 420 to control the GRD 100, including to control the display on the screen, such as zoom, move, change attributes and formats of the image.

In an alternative embodiment, the compass sensor 470 reports the orientation of the handheld unit of GRD 100 to the microprocessor 410, and the microprocessor 410 will rotate the image being displayed on screen of display and user interface unit 420 so that the displayed image orientation is always identical to the actual orientation of the GRD 100 body, for convenience of the user to search for the TD 10 in the same direction as shown on screen in relative to the position of GRD 100.

In yet another alternative embodiment, while GRD 100 is used in an area where GPS signals are of sufficiently good quality, the GPS receiver 480 and the GPS antenna 490 that are also included in the GRD 100 receive signals from GPS satellites and reports the location of GRD 100 to the microprocessor 410. The reported position will be transmitted back to MDS 30 via the WLAN transceiver 430 and antenna 460. Upon receipt of the location from GPS receiver 480 in GRD 100, the MDS 30 will use said location information to correct the GRD locations measured by MDS 30 itself.

In still yet another alternative embodiment, as has been stated in the descriptions of FIG. 6 and FIG. 8, when the MDS 30 utilizes an on-MDS BS transmitter 370 and associated antenna 375, the reference transmitter (and its associated receiver) 440 and antenna 450 can perform the functionalities of the WLAN transceiver 430 and antenna 460 to receive the data for display on screen of display and user interface unit 420. The WLAN transceiver 430 and antenna 460 can be eliminated from GRD 100 in this embodiment.

The method and system described thereinbefore, while used in certain location applications other than E911, the wireless transmitting session of the TD 10 can be either TD originated or TD terminated, with or without human involvement. For example, it can be a call made by TD 10 after the TD 10 is triggered by certain means; it can be a call made by a person or by a machine that is terminated at the TD 10; it also can be a specially defined transmitting session.

Throughout this specification, including the claims and drawings, the terminologies of a "reference transmitter (RT)" and a "reference wireless transmitting device" are used interchangeably. Furthermore, as has been stated, when an RT is combined with a "guiding device", the combined device that has RT and guiding device functionalities is referred to as a guiding and reference device (GRD). According to the context, when referring to a GRD, it may refer to the RT functionality or the guiding device functionality or both of the GRD; when referring to a guiding device, it may mean a standalone guiding device, or the guiding device functionality of a GRD; and when referring to an RT or a reference wireless transmitting device, it may mean a standalone RT or a standalone reference wireless transmitting device, or the RT functionality of a GRD.

The embodiments described herein are examples of structures, systems or methods having elements corresponding to elements of the invention. This written description may enable those skilled in the art to make and use embodiments having alternative elements that likewise correspond to the elements of the invention. The intended scope of the invention thus includes other structures, systems or methods that do not differ from the invention as described herein, and further includes other structures, systems or methods with insubstantial differences from the invention as described herein.

I claim:

1. A method of determining the location of a wireless transmitting device using a movable detection station, comprising the steps of:

obtaining the signal properties of the transmitted signals of said wireless transmitting device;

acquiring and receiving the transmitted signals from said wireless transmitting device by said movable detection station;

performing signal parameter measurements at a plurality of positions of said movable detection station on the signals transmitted by said wireless transmitting device and received by said movable detection station;

determining at least one of the location and orientation of said movable detection station at each of said positions where said signal parameter measurements are performed;

determining the quality of the data resulted from said signal parameter measurements and said determination of the location and orientation of said movable detection station;

performing estimation of the location of said wireless transmitting device; and refining said estimation of the location based on said quality.

2. The method recited in claim 1 wherein said signal parameter measurements include at least one member from the group consisting of:

measurement of delay of the signal propagation, from said wireless transmitting device to said movable detection station, or a parameter(s) related to thereof, at said positions of said movable detection station where said signal parameter measurements are performed;

measurement of difference of the signal propagation delays, from said wireless transmitting device to said movable detection station, or parameters related to thereof, wherein the difference of delays is between pairs of said positions of said movable detection station where said signal parameter measurements are performed; and measurement of angle of arrival of the signals, or parameters related to thereof, from said wireless transmitting device, at said positions of said movable detection station where said signal parameter measurements are performed.

3. The method of claim 2 further including a step of distinguishing the individual propagation paths, and each of said measurements of the signal parameters is conducted on the earliest arrival signal propagation path that demonstrates reliable detection, among multiple signal propagation paths.

4. The method recited in claim 1 wherein said estimation of location of said wireless transmitting device further includes transforming said measured signal parameters and said determined at least one of locations and orientations of said movable detection station obtained at said plurality of positions of said movable detection station into at least one member from the group consisting of:

a TOA (time of arrival) method, transformed from a set of said signal parameters and said locations of said movable detection station obtained at least three of said positions of said movable detection station;

a TDOA (time difference of arrival) method, transformed from a set of said signal parameters and said locations of said movable detection station obtained at least three of said positions of said movable detection station;

an AOA (angle of arrival) method, transformed from a set of said signal parameters and said locations and orientations of said movable detection station obtained at least two of said positions of said movable detection station;

a time and angle of arrival method, transformed from said signal parameters and said locations and orientations of said movable detection station obtained at least one of said positions of said movable detection station; and a time difference and angle of arrival method, transformed from said signal parameters and said locations and orientations of said movable detection station obtained at least one pair of said positions of said movable detection station.

5. The method of claim 1 wherein the said quality of said data is based on at least one member selected from the group consisting of:

signal to interference ratio;

signal to noise ratio;

the geometry of the position of said movable detection station to obtain said data, relative to the position of said wireless transmitting device and other positions of said movable detection station to obtain the other said data, in a location estimation method of concern, or a quantitative measure thereof; and whether or not the detected earliest arrival signal. propagation path is truly line of sight (LOS) path or truly the earliest arrival propagation path, or the confidence level thereof.

6. The method of claim 5 wherein said determining whether or not the detected earliest arrival signal propagation path from a wireless transmitting device is truly LOS path or truly earliest arrival propagation path, comprises the steps of:

from said measured signal parameters, deriving the difference of propagation delays associated with a given pair of said positions of said movable detection station, wherein said propagation delay of concern is from said wireless transmitting device to said movable detection station;

from said determined locations of said movable detection station, deriving the distance between said pair of said positions of said movable detection station; and making determination that, if said propagation delay difference (in absolute value) associated with a given pair of said positions is larger than said distance divided by speed of light associated with the same pair of said positions, then the detected earliest arrival propagation path associated with one of said pair of positions that has longer delay is NOT truly LOS or NOT truly earliest arrival propagation path; and if the said propagation delay difference (in absolute value) associated with a given pair of said positions is not larger than said distance divided by speed of light associated with the same pair of said positions, then the detected earliest arrival propagation paths associated with said pair of positions are UNCERTAIN whether they are truly LOS or earliest arrival propagation paths, solely based on the information associated with this said pair of positions.

7. The method of claim 1 wherein said refining of the estimation of the location of said wireless transmitting device is further performed in a progressive manner while additional data of said signal parameter measurements and said determination of at least one of location and orientation of said movable detection station become available at same or additional said positions of said movable detection station, comprising the steps of:

when additional said data with acceptable quality becomes available, and the total number of said data is below a predetermined maximum, using said additional data together with the existing said data;

when additional said data becomes available, and the total number of said data exceeds a predetermined maximum, excluding the worst quality data among the existing and the additional data to keep the set of usable data at said maximum size;

for repeated measurements taking at a same position of said movable detection station, only keeping the best data obtained at the same said position, and eliminating worse data, regardless new or old;

discovering the necessity of terminating the use of the existing progressive set of said data, and restarting a new progressive set of said data, on such conditions as, finding new earlier arrival propagation path, and/or finding said wireless transmitting device is moving;

discovering that previously discarded said data are actually of good quality, based on judgment using newly incoming said data, and recalling the discarded good quality data for use in said refining of the estimation of the location of said wireless transmitting device; and discovering that previously kept said data are actually of poor quality, based on judgment using newly incoming said data, and discarding the kept poor quality data in said refining of the estimation of the location of the said wireless transmitting device.

8. The method of claim 7 further including a predetermined timer after said maximum data set size has reached, and every time a set of new good quality data is available and an equivalent amount of worst quality old data is excluded, the timer resets; if no additional good data is added at the time when said timer expires, the next incoming data, although probably being worse in quality than the worst in the existing set, will replace the worst in the existing set, the timer then resets and the process continues.

9. The method of claim 7 wherein the process for repeated measurements taking at a same position of said movable detection station, only keeping the best data obtained at the same said position, and eliminating worse data, regardless new or old, further subject to a predetermined timer that resets every time when better data replaces worse, and if the timer expires, the next available and acceptable quality data replaces the too old good data.

10. The method of claim 1 wherein said refining of said estimation of the location of said wireless transmitting device includes:
in performing said estimation of location, applying at least one member from the group consisting of:
excluding the use of the data obtained in said signal parameter measurements and said determination of at least one of location and orientation of said movable detection station performed at some of said positions where said quality of said data is determined to be poor; and
applying a set of weighting factors in contributing to the estimation of location resulted from the data obtained in said signal parameter measurements and said determination of at least one of location and orientation of said movable detection station at said positions, where each of the set of weighting factors is a monotonically non-decreasing function of said determined quality of corresponding said data.

11. A method of determining the location of a wireless transmitting device using a movable detection station together with at least one additional detection station(s), comprising the steps of:
obtaining the signal properties of the transmitted signals of said wireless transmitting device;
acquiring and receiving the transmitted signals from said wireless transmitting device by said movable detection station;
acquiring and receiving the transmitted signals from said wireless transmitting device also by said at least one additional detection station(s);
performing signal parameter measurements at a plurality of positions of said movable detection station on the signals transmitted by said wireless transmitting device and received by said movable detection station;
performing signal parameter measurements on said signals transmitted by said wireless transmitting device also by said at least one additional detection station(s);
if any said at least one additional detection station(s) is movable detection station(s), determining at least one of the location and orientation of said additional movable detection station(s) at each of the positions where said signal parameter measurements are performed;
sharing the resulting data of said signal parameter measurements obtained by said movable detection station and said at least one additional detection station(s); also sharing the resulting data of said determined at least one of the locations and orientations of said movable detection station and said additional movable detection station(s); and
performing and refining the estimation of the location of said wireless transmitting device using said shared data.

12. A method of determining the location of a wireless transmitting device that communicates with at least one basestation of a wireless communication network, improving the accuracy of the determined location, and increasing the transmitting time duration for the location determination supported by a battery of said wireless transmitting device using a movable detection station that is equipped with a basestation transmitter and receiver, referred to herein as movable detection-and-base station, comprising the steps of:
obtaining the signal properties of the transmitted signals of said wireless transmitting device;
acquiring and receiving the transmitted signals from said wireless transmitting device by said movable detection-and-base station;
starting transmitting by said movable detection-and-base station after said movable detection-and-base station in question has detected that the received signal quality from said wireless transmitting device is higher than a predetermined threshold;
instructing said wireless transmitting device to hand off to said movable detection-and-base station;
controlling the transmitted signal properties of said wireless transmitting device;
performing signal parameter measurements at a plurality of positions of said movable detection-and-base station on the signals transmitted by said wireless transmitting device and received by said movable detection-and-base station, before and after said hand-off(s);
coordinating said control of the transmitted signal properties with activities of said signal parameter measurements;
determining at least one of the location and orientation of said movable detection-and-base station at each of said positions where said signal parameter measurements are performed; and
performing and refining estimation of the location of said wireless transmitting device.

13. The method recited in claim 12 wherein said transmitted signal properties are selected from at least one member of the group consisting of:
transmitted power;
transmitting duration;
transmitting duty cycle;
transmitted signal modulation method;
transmitted signal spreading method; and
transmitted signal frequency hopping method.

14. A method of determining the position of a target wireless transmitting device, and guiding the searching personnel(s) or searching robot(s) to physically reach said target wireless transmitting device, by making use of movable detection station(s) and movable reference wireless transmitting device(s), comprising the steps of:
determining the site (i.e., a localized area) where the target wireless transmitting device is located;
placing at least one said movable detection station(s) and at least one said movable reference wireless transmitting device(s) on site of or in the proximity of said target wireless transmitting device;
transmitting wireless signals from said at least one said movable reference wireless transmitting device(s);
obtaining the signal properties of the transmitted signals from said target wireless transmitting device and said movable reference wireless transmitting devices;
acquiring and receiving the transmitted signals from said target wireless transmitting device and said movable reference wireless transmitting device(s) by said movable detection station(s);
performing signal parameter measurements on the signals transmitted by said target and said reference wireless transmitting devices and received by said movable detection station(s);
determining the position and orientation of said movable detection station(s);
performing estimations of the positions of said target wireless transmitting device and said reference wireless transmitting device(s);

displaying on a displaying device the position of said target wireless transmitting device relative to the position(s) of said movable reference wireless transmitting device(s), and optionally also said movable detection station(s); and moving said movable reference wireless transmitting device(s) so that the estimated and/or the displayed position of said reference wireless transmitting device relative to the estimated and/or displayed position of said target wireless transmitting device becomes closer, till said movable reference wireless transmitting device(s) physically reaches said target wireless transmitting device.

15. The method of claim 14 wherein said wireless signals transmitted from said movable reference wireless transmitting device(s) have same or similar radio propagation and detectability properties as those of said signals transmitted from said target wireless transmitting device.

16. The same or similar radio propagation and detectability properties recited in claim 15, including:
    same air interface technology;
    same frequency;
    frequency close to each other;
    same bandwidth;
    similar bandwidth;
    same modulation;
    similar modulation;
    same frequency hopping properties;
    similar frequency hopping properties;
    same spreading properties;
    similar spreading properties;
    same transmitted power;
    similar transmitted power;
    same power control criterion;
    similar power control criterion;
    same transmitting duration;
    similar transmitting duration;
    same transmitting time slots; and
    transmitting time slots close to each other in time.

17. The method of claim 14 further including a step of producing a quantitative measure to indicate how likely the reference and the target wireless transmitting devices are within the same physical land or construction structure (such as stairs), by comparing the similarity of characteristics of the signals transmitted by said target wireless transmitting device with those of the signals transmitted by said reference wireless transmitting device(s), and received by said movable detection station(s).

18. The characteristics of the signals transmitted by said target wireless transmitting device and said reference wireless transmitting device(s) recited in claim 17, comprising of:
    the received signal strengths;
    the reported transmitted power level; and
    the multipath propagation profiles.

19. The method of claim 14 further including displaying of the traces of the movements of said reference wireless transmitting device(s) on said displaying device.

20. The method of claim 14 wherein said display of the relative positions of said target wireless transmitting device, said reference transmitting device(s) and said movable detection station(s) is shown on at least one displaying device(s) of:
    a guiding device used by searching personnel(s);
    a movable detection station;
    a searching robot control station;
    a public safety answering point;
    a dispatch center; and
    a command center.

21. The method of claim 20 when said guiding device is physically combined with said reference wireless transmitting device, or when said guiding device and said reference wireless transmitting device are carried by a same user, further including a method of an automatic image orientation adjustment of said display, so that the orientation of the displayed symbol of said target wireless transmitting device relative to the displayed symbol of said reference wireless transmitting device is always identical to the orientation of the actual physical position of said target wireless transmitting device relative to the user of said guiding device regardless the orientation change of said guiding device.

22. The automatic image orientation adjustment of said display recited in claim 21, comprising the steps of:
    receiving the original image information that uses absolute direction such as north as orientation;
    determining the physical orientation of said guiding device;
    rotating said original image by the amount of the rotation of said determined orientation of guiding device from said absolute direction;
    displaying the rotated image; and
    continuously detecting the change of the orientation of said guiding device, and repeating above steps.

23. The method of claim 20 when said reference wireless transmitting device is installed on said searching robot, further including a method of an automatic image orientation adjustment of said display, so that the orientation of the displayed symbol of said target wireless transmitting device relative to the displayed symbol of said reference wireless transmitting device is always identical to the orientation of the actual physical position of said target wireless transmitting device relative to the orientation of robot vision regardl6ss the orientation change of said robot vision.

24. The automatic image orientation adjustment of said display recited in claim 23, comprising the steps of:
    producing the original image information that uses absolute direction such as north as orientation;
    determining the physical orientation of said robot vision;
    rotating said original image by the amount of the rotation of said determined orientation of said robot vision from said absolute direction;
    displaying the rotated image; and
    continuously detecting the change of the orientation of said robot vision, and repeating above steps.

25. The method of claim 14 wherein said display of the positions of said target wireless transmitting device, said reference transmitting device(s) and said movable detection station(s) is overlaid on top of a pre-stored electronic map image of local area, arid optionally further overlaid on top of a remote sensing photo of local land structures.

26. The method of claim 25 wherein said display further includes information about a third dimension along the height of positions of said target wireless transmitting device, said reference transmitting device(s) and said movable detection station(s).

27. The method of claim 14 wherein said estimation of the position of said target wireless transmitting device and said reference wireless transmitting device(s) includes transforming said measured signal parameters and said determined position and orientation into at least one member of the following location estimation methods, consisting of:
    a time and angle of arrival method in two dimensions; and
    a time and angle of arrival method in three dimensions.

28. The method of claim 14 wherein said determination of positions and said guiding of search can be improved by further including the steps of:

determining the absolute positions of said movable detection station(s) and said movable reference wireless transmitting device(s) in at least two dimensions, using either a GPS based method (or alike) or an inertia based method or both; and correcting said estimated relative positions using said determined absolute positions.

29. The method of claim 14 wherein said determination of positions and said guiding of search can be improved by further utilizing a plurality of said movable detection stations placed on site stationary at distinct positions, with following additional steps being performed:

determining the positions and orientations of each of said movable detection stations placed on site;

sharing said signal parameters measured by a plurality of said movable detection stations; and performing said estimation of positions of said target and said reference wireless transmitting devices jointly using said shared measured parameters.

30. The method of claim 14 wherein said determination of positions and said guiding of search can be improved further by moving around at least one said movable detection station(s) in the close proximity of the site where the said target wireless transmitting device is located, with the following additional steps being performed at a plurality of positions of said movable detection station(s):

performing said signal parameter measurement on the signals from said target and said reference wireless transmitting device(s);

determining the position and orientation of said moving movable detection station(s) at each of the positions where said signal parameter measurement are performed; and performing and refining said estimation of positions of said target and said reference wireless transmitting devices using the said measured parameters obtained at said plurality of positions.

31. The method of claim 30 wherein said estimation of the positions of said target wireless transmitting device and said reference wireless transmitting device(s) includes transforming said measured signal parameters and said determined positions and orientations of said movable detection station(s) into at least one member of the group, consisting of:

an AOA (angle of arrival) method in two dimensions;
an AOA (angle of arrival) method in three dimensions;
a time and angle of arrival method in two dimension;
a time and angle of arrival method in three dimensions;
a TOA (time of arrival) method in two dimensions;
a TOA (time of arrival) method in three dimensions;
a TDOA (time difference of arrival) method in two dimensions;
a TDOA (time difference of arrival) method in three dimensions;
a time difference and angle of arrival method in two dimensions; and
a time difference and angle of arrival method in three dimensions.

32. The method of claim 14 wherein said position determination and said guiding can be improved and the battery supported transmitting time duration of said target and/or reference wireless transmitting device(s) can be increased by further including:

controlling the transmitted signal properties of said target wireless transmitting device(s);
controlling the transmitted signal properties of said reference wireless transmitting device(s); and
coordinating said controls of the transmitted signal properties with activities of said signal parameter measurements.

33. The transmitted signal properties recited in claim 32 are selected from at least one member of the group consisting of:
transmitted power;
transmitting duration;
transmitting duty cycle;
transmitted signal modulation method;
transmitted signal spreading method; and
transmitted signal frequency hopping method.

34. The method of claim 14, when said target wireless transmitting device is communicating with at least one basestation in a wireless communication network, and when said movable detection station(s) is also equipped with a base station transmitter and receiver, referred to herein as movable detection-and-base station(s), further including a method of improving said position determination and said guiding, and increasing the transmitting time duration for the said position determination and guiding supported by the batteries of said target and said reference wireless transmitting devices, comprising additional steps of:

starting transmitting by said movable detection-and-base station(s) after the movable detection-and-base station(s) in question has detected that the received signal quality from said target wireless transmitting device and/or said reference wireless transmitting device is higher than a predetermined threshold;

instructing said target wireless transmitting device to hand off to said movable detection-and-base station(s);

instructing said reference wireless transmitting device(s) to hand off to said movable detection-and-base station(s);

controlling the transmitted signal properties of the said target wireless transmitting device by said detection-and-base station(s);

controlling the transmitted signal properties of the said reference wireless transmitting device(s) by said detection-and-base station(s); and coordinating said controls of the transmitted signal properties with activities of said signal parameter measurements.

35. The transmitted signal properties recited in claim 34 are selected from at least one member of the group consisting of:
transmitted power;
transmitting duration;
transmitting duty cycle;
transmitted signal modulation method;
transmitted signal spreading method; and
transmitted signal frequency hopping method.

36. A movable detection station for determining the location of a wireless transmitting device(s), and workable with at least one reference wireless transmitting device or at least one guiding device for guiding the search for said wireless transmitting device(s), comprising:

at least one first antenna;

a first receiver, coupled with said at least one first antenna, for receiving signals from at least one of said wireless transmitting device(s), said reference wireless transmitting device(s) when available, said guiding device(s) when available, and producing digitized baseband signals;

a second receiver, coupled with said at least one first antenna, for receiving signals from GPS satellites (or other similar systems), producing precise frequency reference and timing to said first receiver, and producing digitized GPS (or similar) information related to the location and orientation of the movable detection station in question;

a transceiver coupled with said at least one first antenna, conveying information to said guiding device(s) for displaying on screen of said guiding device(s) when the guiding device(s) being in operation with the movable detection station;

a display and user interface unit, for presenting the location and guiding information to the user and accepting user control to the movable detection station in question; and a digital signal processing unit, coupled with said first and second receivers, said transceiver, and said display and user interface unit, performing signal processing and control tasks; and whereby the movable detection station is operable to perform at least one of performing signal parameter measurements on the signals from at least one of said wireless transmitting device(s), said reference wireless transmitting device(s), and said guiding device(s);

determining at least one of the location and orientation of said movable detection station in question;

determining the quality of said signal parameter measurements and said determined at least one of the location and orientation;

determining the location estimation of at least one of said wireless transmitting device(s), said reference wireless transmitting device(s), and said guiding device(s);

refining the location estimation of at least one of said wireless transmitting device(s), said reference wireless transmitting device(s), and said guiding device(s) based on at least one of said quality and relative position changes between said wireless transmitting device and at least one of said reference wireless transmitting device(s), and said guiding device(s);

accepting user controls through said display and user interface unit; and producing information for display on at least one of said display and user interface unit and said guiding device(s).

37. The system of claim 36 wherein said at least one first antenna includes an array antenna, and said first receiver is an array receiver whose array channels are phase locked to each other.

38. The system of claim 37 wherein said array antenna can be configured to at least one member of group consisting of:

a one-dimensional array antenna, spanning over one of the three dimensions;

a two-dimensional array antenna, spanning over two of the three dimensions; and a three-dimensional array antenna.

39. The system of claim 36 wherein said first at least one antenna includes a narrow beam antenna mounted onto a rotatable structure with an angle sensing means coupled to said digital signal processing unit.

40. The system of claim 36 further comprising at least one member from the group consisting of:

a compass sensor, coupled to said signal processing unit, for determining the orientation of the structure of said first antenna in horizontal plane; and a gravity sensor, coupled to said signal processing unit, for determining the orientation of the structure of said first antenna in vertical direction.

41. A movable detection station for determining the location of a wireless transmitting device that communicates to a basestation in a wireless communication network, or guiding the search for such wireless transmitting device(s), comprising of:

at least one antenna;

a first receiver, coupled with said at least one antenna, for receiving signals from said wireless transmitting device(s) and including basestation receiver functionalities, and producing digitized baseband signals;

a second receiver, coupled with said at least one antenna, for receiving signals from GPS satellites (or other similar systems), producing precise frequency reference and timing to said first receiver, and producing digitized GPS (or similar) information related to the location and orientation of the movable detection station in question;

a basestation transmitter, coupled to said at least one antenna, for performing at least one of transmitting signals to said wireless transmitting device(s), enabling the basestation capabilities to said movable detection station, allowing said wireless transmitting device(s) to hand off to said movable detection station in question, and conveying information for display;

a display and user interface unit, for presenting the location and guiding information to the user and accepting user control to the movable detection station;

a digital signal processing unit, coupled with said first and second receivers, said basestation transmitter, and said display and user interface unit, performing signal parameter measurements on the signals provided by the first receiver, determining at least one of the location and orientation of said movable detection station in question, determining and refining the location estimation of said wireless transmitting device(s), providing basestation signal processing functionalities, accepting user controls through said display and user interface unit, producing information for display on said display and user interface unit, and controlling all the elements within the movable detection station.

42. A movable detection station for determining the location of a wireless transmitting device, and guiding the search for said wireless transmitting device, comprising:

at least one first antenna;

a first receiver, coupled with said at least one first antenna, for receiving signals from said wireless transmitting device, and producing digitized baseband signals;

a second receiver, coupled with said at least one first antenna, for receiving signals from GPS satellites (or other similar systems), producing precise frequency reference and timing to said first receiver, and producing digitized GPS (or similar) information related to the location and orientation of the movable detection station in question;

a display and user interface unit, for presenting the location and guiding information to the user and accepting user control to the movable detection station in question;

a digital signal processing unit, coupled with said first and second receivers and said display and user interface unit, performing signal parameter measurements on the signals provided by the first receiver, determining the location and orientation of said movable detection station, determining and refining the location estimation of said wireless transmitting device, accepting user controls through said display and user interface unit, producing information for display on said display and user interface unit, and controlling all the elements within the movable detection station;

a second antenna, transmitting signals for calibrating said at least one first antenna and said first receiver, and when said wireless transmitting device communicates with a basestation in a wireless communication network, also receiving signals from same basestation; and a calibration transmitter and mobile receiver, coupled with said second antenna, also coupled with said digital signal processing unit, producing signals for calibrating said at least one first antenna and first receiver, and when said wireless transmitting device communicates with a basestation in a wireless communication network, also receiving signals from same basestation that said wireless transmitting device is communicating with to obtain signaling messages and network timing, and passing them to said digital signal processing unit.

43. A guiding and reference device, used to work with a detection station to determine the position of a target wireless transmitting device and guiding the search for said target wireless transmitting device, comprising of:

at least one antenna;

a reference transmitter, coupled to said at least one antenna, for producing signals similar to what said target wireless transmitting device produces;

a transceiver, coupled with said at least one antenna, receiving the position and guiding information from said detection station, and transmitting protocol signaling messages to said detection station;

a microprocessor, coupled with said reference transmitter and said transceiver, accepting and processing the position and guiding information received by said transceiver, configuring and controlling the functionalities of all the connected functional units within said guiding and reference device;

a display and user interface unit, coupled with said microprocessor, accepting user controls for said guiding and reference device and passing them to said microprocessor, and displaying to the user the position and guiding information that is received and processed by said microprocessor; and whereby the guiding and reference device is operable to perform at least one of being configured to transmit radio signals with properties similar to that of said target wireless transmitting device; and displaying its positional information relative to that of said target wireless transmitting device.

44. The guiding and reference device of claim 43 wherein said transceiver and said reference transmitter are combined.

45. The guiding and reference device of claim 43 further comprising:

a GPS receiver, coupled to said at least one antenna and said microprocessor, receiving GPS signals (or signals from similar systems) for obtaining absolute position information, and passing said information to said microprocessor and then further transmitting to a detection station through said transceiver and said at least one antenna;

a compass sensor, coupled to said microprocessor, providing orientation information of said guiding and reference device for image rotation and displaying processing.

* * * * *